(12) United States Patent
Snyder et al.

(10) Patent No.: US 9,153,076 B1
(45) Date of Patent: Oct. 6, 2015

(54) METHOD FOR STRUCTURING A MORTGAGE SERVICING RIGHT ASSET EFFICIENTLY TO INCLUDE A HEDGING COMPONENT

(75) Inventors: Morgan C. Snyder, Clifton, VA (US); Gail Vance, Alexandria, VA (US)

(73) Assignee: FEDERAL HOME LOAN MORTGAGE CORPORATION, Mclean, VA (US)

( * ) Notice: Subject to any disclaimer, the term of this patent is extended or adjusted under 35 U.S.C. 154(b) by 1510 days.

(21) Appl. No.: 12/144,982

(22) Filed: Jun. 24, 2008

Related U.S. Application Data

(63) Continuation of application No. 09/860,575, filed on May 21, 2001, now Pat. No. 7,512,559, which is a continuation of application No. 09/726,491, filed on Dec. 1, 2000, now abandoned.

(60) Provisional application No. 60/210,022, filed on Jun. 8, 2000.

(51) Int. Cl.
*G07B 17/00* (2006.01)

(52) U.S. Cl.
CPC ..................................... *G07B 17/00* (2013.01)

(58) Field of Classification Search
USPC .......................................................... 705/30
See application file for complete search history.

(56) References Cited

U.S. PATENT DOCUMENTS

| 4,412,287 A | 10/1983 | Braddock, III |
| 4,674,044 A | 6/1987 | Kalmus et al. |
| 4,677,552 A | 6/1987 | Sibley, Jr. |
| 5,689,650 A | 11/1997 | McClelland et al. |
| 5,911,136 A * | 6/1999 | Atkins ......................... 705/36 R |
| 6,070,151 A * | 5/2000 | Frankel ....................... 705/36 R |
| 6,233,566 B1 | 5/2001 | Levine et al. |
| 7,072,851 B1 * | 7/2006 | Wilcox et al. ............... 705/14.34 |
| 2004/0230512 A1 * | 11/2004 | Gulati ............................ 705/36 |

OTHER PUBLICATIONS

Dictionary of Finance and investment Terms, Fifth Edition, HG151. D69 1998.
Looking for shelter Harold I. Levine, Russell C. Wirbicki. ABA Journal. Chicago: Feb 2000. vol. 86, p. 61, 1 pg.

* cited by examiner

*Primary Examiner* — Garcia Ade
(74) *Attorney, Agent, or Firm* — Oblon, McClelland, Maier & Neustadt, L.L.P.

(57) ABSTRACT

Method for providing mortgage collateralized servicing (MCS) contracts to mortgage servicers as a tool to manage hedging risk. The MCS contracts of the present invention pays mortgage servicers for their services, while providing a "self-hedging" component that reduces (or eliminates) the need for the servicer to engage in additional investing and trading in derivatives in order to hedge against servicing contract risks. Such risks typically include default, delinquency, pre-payment, and interest rate fluctuations associated with mortgage loans. Additionally, the method preserves the tax and accounting treatment for mortgage servicing rights contracts preferred by servicers.

22 Claims, 5 Drawing Sheets

| TOTAL CASH FLOWS | | | |
|---|---|---|---|
| YEAR OF PREPAYMENT | MCS | MSR | DIFFERENCE (MCS LESS MSR) |
| 1 | $1,079.70 | $ 249.06 | $ 830.64 |
| 2 | $1,158.70 | $ 495.95 | $ 662.76 |
| 3 | $1,236.96 | $ 740.49 | $ 496.47 |
| 4 | $1,314.40 | $ 982.49 | $ 331.91 |
| 5 | $1,390.96 | $1,221.74 | $ 169.22 |
| 6 | $1,466.56 | $1,458.01 | $ 8.55 |
| 7 | $1,541.14 | $1,691.05 | $ (149.92) |
| 8 | $1,614.59 | $1,920.60 | $ (306.01) |
| 9 | $1.686.83 | $2,146.36 | $ (459.52) |

*Fig.4*

METHOD FOR STRUCTURING A MORTGAGE SERVICING RIGHT ASSET EFFICIENTLY TO INCLUDE A HEDGING COMPONENT

CROSS-REFERENCE TO OTHER APPLICATIONS

The present continuation application claims the benefit of priority under 35 U.S.C. §120 to application Ser. No. 09/860,575, filed on May 21, 2001, which is a continuation of, and claims priority under 35 U.S.C. §120 to U.S. patent application Ser. No. 09/726,491, filed Dec. 1, 2000, which claimed priority under 35 U.S.C. §119 to U.S. Provisional Patent Application Ser. No. 60/210,022, filed Jun. 8, 2000, each of which is incorporated herein by reference in its entirety.

BACKGROUND OF THE INVENTION

1. Field of the Invention

The present invention relates generally to financial products and, more particularly, to financial instruments related to mortgage lending and the securitization and servicing of mortgage loans.

2. Related Art

Consumers who desire to purchase a home must often borrow funds from a lender (e.g., a bank, mortgage finance company or the like). As is well known in the relevant art(s), the legal document where the consumer (i.e., the borrower) uses the property as security to guarantee repayment of the loan is known as a mortgage.

Today, lenders sell over half of all mortgage loans they originate into the secondary market. By selling mortgage loans on the secondary market, lenders liberate capital in order to have funds to meet additional consumer demand for home mortgages. That is, the secondary market keeps the supply of money for housing widely available and ultimately lowers costs to consumers.

Within the secondary market, lenders normally sell the mortgage loans to a secondary market conduit or wholesaler. Lenders may sell a single mortgage loan at a time or sell several mortgage loans at a time to a wholesaler. The wholesaler then packages the purchased mortgage loans into pools. For example, a typical pool may consist of ten loans with a total principal amount of $1 million or 3,000 mortgage loans with a total principal amount of $300 million. A wholesaler typically enhances the mortgage loan pools by guaranteeing full payment of the mortgage loans and providing administrative services for the pool. The wholesaler then forms the enhanced mortgage loan pools into securities and sells them to investors. This process is known as securitization. Investors that purchase the securitized mortgage loan pools are typically banks, pension funds, insurance companies, money market funds or other institutions. The wholesaler that purchases and securitizes the mortgage loan pools takes on a variety of risks. When the wholesaler guarantees the mortgage loan, it accepts the risk that the borrower may default on the mortgage loan. If default occurs, the wholesaler must pay the mortgage principal due on the mortgage loan to the investor.

The wholesaler also accepts the risks associated with the administration of the securitized mortgage loan pool. Administrative duties on the securitized mortgage loan pool include remitting borrower mortgage payments to investors on a monthly basis, making payments to investors on its guarantees, tax reporting and transfer and registrar functions on the securities. To perform its administrative duties on the securitized mortgage loan pool adequately, the wholesaler must assure that the mortgage loans are properly serviced.

Servicing of mortgage loans generally involves all functions relating to the borrower's responsibilities on the mortgage. These functions include, for example, sending to the borrower a coupon book that indicates when monthly payments are due and the amount of the payment, calculating and collecting escrow balances, and paying taxes and insurance from the escrow balances. The servicing function requires significant time and attention. For example, if the borrower is late on a payment, the servicer must contact the borrower to discuss the missed or late payment, write a letter to a delinquent borrower after payments are sixty days late, and so on. Servicing also includes all actions necessary to foreclose upon defaulted mortgage loans. Servicing responsibilities end when the mortgage loan is fully paid at the end of its fixed term (e.g., a 30 year fixed loan), the mortgage loan is fully paid in advance (i.e., prepayment) or when the mortgage loan is foreclosed upon for a payment default.

Lenders sometimes perform the servicing functions on the mortgage loans they originate. However, lenders may not wish to undertake servicing responsibilities for a variety of business-related reasons. Lenders that do not wish to perform the servicing functions for a mortgage loan typically sell the right to perform the servicing function to another company, which may be another lender (i.e., a lender/servicer) or a company that specializes in servicing mortgage loans (i.e., a servicer). When a wholesaler purchases mortgages from lenders, the wholesaler becomes responsible for servicing the mortgage loan. Wholesalers normally do not themselves perform the mortgage loan servicing function. Therefore, a wholesaler normally permits the existing relationship between the borrower and the servicer to continue and it pays the servicer to service the mortgage loan.

The contractual right to service a mortgage loan is known as a mortgage servicing right (MSR) contract. Traditionally, the MSR contract has permitted the servicer to retain not only a portion of the interest paid on the mortgage loan by the borrower but also ancillary revenue from float income on escrow balances, float income on principal and interest payments held prior to remittance to the wholesaler, ancillary fees such as late payment fees and any collateral benefits resulting for the servicer's relationship with the borrower (known as "cross-sell opportunities"). The interest portion that wholesalers permit servicers to retain are established by each wholesaler. They are typically expressed as a minimum for a mortgage type, such as a minimum of 0.375% interest for an adjustable-rate mortgage, or a minimum of 0.25% interest for a fixed-rate mortgage. For example, if a wholesaler purchases a fixed-rate mortgage loan with an 8% interest rate, the wholesaler might retain 7.75% interest on the principal balance of the mortgage loan and might permit the servicer to retain 0.25% interest on the principal balance of the mortgage loan. This is known as an "interest strip.

When a servicer acquires an MSR contract, it books as an asset on its books the net present value of the expected income from the MSR contract. The valuation includes the income the servicer expects to receive from all the normal attributes of a mortgage servicing right contract, including the interest percentage, float and fee income and the benefits of the cross-sell opportunities. The servicer places the value of the MSR contract asset on its books in the year the MSR right is acquired. Thereafter, the servicer amortizes the asset over the remaining term of the mortgage loan.

Like wholesalers, servicers also face risks. The primary risk is that the servicer's income will be reduced if the borrower prepays the mortgage loan earlier than expected. If a mortgage loan is prepaid, no further interest is due from the borrower, and the interest cash flow and ancillary income from the serviced mortgage loan ceases.

Because servicers face risks on MSR contracts, they typically engage in "hedging." As is well known in the relevant art(s), hedging is the process of protecting a position. It is the placement of a position to offset an exposed cash or physical market position. Hedging is often done through the trading of financial instruments known as derivatives. A derivative is an investment vehicle whose value is based on the value of another security or underlying asset. That is, a derivative is essentially a financial instrument that is derived from the future movement of something that cannot be predicted with certainty. Common examples of derivatives include futures contracts, forward contracts, options and swaps. Derivatives help in managing risks by allowing banks, companies, organizations and the like to divide their risk into several pieces that may be passed off to other entities who are willing to shoulder the risk for an up-front fee or future payment stream.

The use of derivatives to counter MSR contract risk, however, exposes servicers to other risks because the relationship between the value of a derivative and the underlying asset are not linear and can be very complex. Economists have developed several pricing models in order to value certain types of derivatives. Each model, however, has inherent limitations and thus poses additional risks. In essence, while attempting to limit their MSR contract exposure by hedging, servicers are exposed to the risk of pricing derivatives. The complexity of managing this risk is evident from the availability of sophisticated software packages to price, hedge and account for MSR contracts such as the WinOAS™ software package available from Mortgage Industry Advisor Corporation of New York, N.Y.

Further complicating the use of derivatives for hedging of MSR contracts is the Financial Accounting Standards Board (FASB) Statement (FAS) No. 133, "Accounting for Derivative Instruments and Hedging Activities," which takes effect on Jan. 1, 2001. As is well known in the relevant art(s), FASB is the designated organization in the private sector for establishing standards of financial accounting and reporting. Those standards govern the preparation of financial reports. They are officially recognized as authoritative by the Securities and Exchange Commission. FAS 133 will make the accounting treatment of hedging more complex and volatile.

Additionally, the average size of home mortgages has increased dramatically in recent years. Since MSR contracts are traditionally based on the principal amount of the mortgage loans, servicer compensation has increased while the servicer's cost of servicing has been stable or even decreased. Thus, there is no longer a direct and justifiable connection between current servicing compensation and servicing costs.

In reaction to the above situations, the marketplace has identified several possible approaches.

First, it has been proposed to reduce the servicer's interest strip below the current minimum, down to 0.10%. This would somewhat reduce the need for and cost of hedging. However, this approach is not entirely satisfactory. It significantly lowers the income to the servicer on the MSR. Thus, this approach concerns many investors in securitized mortgage pools who worry about experiencing lower yields because the underlying mortgage loans will not be attentively serviced for such a low fee.

Second, it has been proposed to replace the interest strip provisions in MSR contracts with a "fee for service" type arrangement. For example, a servicer would be paid "$50 per mortgage loan per year" for servicing. This proposal removes the volatility to the servicer's income statement and balance sheet resulting from MSR hedging activity. However, this approach is not entirely satisfactory because it does not receive the tax and accounting treatment preferred by servicers. Investors in securitized mortgage pools have the same concerns about this approach as they do for the first approach described above.

Third, it has been proposed that servicers be paid a flat fee up front for servicing each mortgage loan throughout its term. However, this approach is not entirely satisfactory because servicers could not be certain that the single payment would adequately compensate them for the costs and risks of servicing.

Therefore, what is needed is a method that provides the income and accounting attributes of the current MSR contracts as well as an efficient method of managing hedging risk.

SUMMARY OF THE INVENTION

The present invention, which meets the above-identified needs, is a method for structuring a mortgage servicing right asset efficiently to include a hedging component. The method, known as a Mortgage Collateralized Servicing (MCS) contract, should allow lenders and servicers to invest in "self-hedging" MSR contracts that reduce (or eliminate) the need for additional investing and trading in financial instruments (e.g., derivatives) in order to hedge against MSR contract risks. These "self-hedging" MSR contracts should also reduce certain negative impacts associated with FAS 133 by creating an inherently less volatile asset.

The present invention is a method for managing hedging risk using an MCS contract. The method of the present invention brings about a new financial instrument and thus creates a system for its creation and transfer.

The method, in an embodiment, involves a lender originating a mortgage loan. For example, the lender may lend $100,000 to a consumer for 30 years at an 8% interest rate. Next, the lender sells 100% of the mortgage loan (i.e., $100,000) to the wholesaler. The wholesaler then places the mortgage loan into a pool with other mortgage loans, securitizes the mortgages loans and sells the securities to investors. In this process, the wholesaler would include, for example, 99% of the principal amount of the mortgage loan (i.e., $99,000 of the original $100,000 mortgage loan principal) at an 8% interest rate in the mortgage pool. The wholesaler would retain 1% of the principal amount of the mortgage loan on its books (i.e., $1,000 of the original $100,000 mortgage loan principal) and the right to 8% interest on that retained amount. The wholesaler would then record, for accounting purposes, a 1% whole-loan asset retained on its books and an offsetting liability represented by the MCS contract with the servicer.

The servicer that acquires the MCS contract from the wholesaler values the MCS contract and places it on its books as an asset according to its normal method of accounting. As the servicer begins to receive payments from the borrower, the servicer keeps 1% of each payment of principal and interest made by the borrower. The servicer sends the remainder of the borrower's payment (i.e., the other 99%) to the wholesaler. Payments continue in this manner until the mortgage obligation is fully discharged.

If the borrower prepays the mortgage loan, the method involves the servicer's keeping 1% of the borrower's principal and interest prepayment. For example, if the borrower prepays $50,000 in principal (together with the interest due on that principal amount), the servicer retains $500 in principal and 1% of any interest accompanying the prepayment. The servicer then sends the remainder of the prepayment to the wholesaler, who would then pass amounts due on the security to the investor. In the above-given example, the investor would receive 99% of the $50,000 principal prepayment (i.e., $49,500 in principal) and any interest due to the investor. The wholesaler would then write off both the 1% whole-loan asset and the MCS liability. The servicer records its $500 in principal and any interest on the prepayment as income and writes off the value of its MCS contract.

An advantage of the present invention is that the MCS contract includes both an interest and principal component. The inclusion of the principal component in the MCS and the method for compensating servicers under the MCS contract provides servicers with "self-hedging" MSR contracts. The principal component protects the value of the interest component in the event of prepayment of the related mortgage loan.

Another advantage of the present invention is that the changes in value of the interest and principal components are highly correlated. The high level of correlation reduces the servicer's need to protect the value of its MCS contract asset by hedging in derivative instruments. Reduction in the servicer's level of derivative investment reduces the volatility on the servicer's balance sheet and earnings statement resulting from the recent promulgation of Financial Accounting Standards Board (FASB) Statement (FAS) No. 133.

Another advantage of the present invention is that it reduces the servicer's risks associated with trading and investing in derivative instruments.

Another advantage of the present invention is that both servicers and investors are likely to have confidence that it fairly compensates the servicer for its servicing obligations.

Further features and advantages of the invention as well as the structure and operation of various embodiments of the present invention are described in detail below with reference to the accompanying drawings.

BRIEF DESCRIPTION OF FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 4 is a chart highlighting the advantages of the present invention's MCS contract cash flow in comparison to the current traditional MSR contract cash flow.

DETAILED DESCRIPTION OF THE PREFERRED EMBODIMENTS

I. Overview

The present invention is directed to a method and computer program product for structuring a mortgage servicing right asset efficiently to include a hedging component.

In one embodiment of the present invention, an organization acting as a secondary market conduit or wholesaler for mortgages provides mortgage collateralized servicing (MCS) contracts to mortgage servicers. These MCS contracts include a "self-hedging" attribute that reduces (or eliminates) the servicer's need to invest in and trade derivatives in order to hedge against the servicing contract risks. Thus, these "self-hedging" MCS contracts help servicers manage hedging risk, while reducing the volatility resulting from accounting for derivative investments under FAS 133. In sum, the present invention is an alternative to such proposals as reducing the interest strip servicers currently receive as compensation, offering an "$x per loan per year" flat fee for servicing or paying a flat fee only at the beginning of the servicing contract.

The present invention is described in terms of the above examples. This is for convenience only and is not intended to limit the application of the present invention. In fact, after reading the following description, it will be apparent to one skilled in the relevant art(s) how to implement the following invention in alternative embodiments.

The terms "servicer," "lender," "customer," "entity," and the plural form of these terms are used interchangeably throughout herein to refer to those who would access, use, or benefit from the present invention.

II. General Operation of the Present Invention

The present invention's method of providing mortgage collateralized servicing (MCS) contracts to mortgage servicers is explained in detail below. The description is divided, for ease of explanation, into: (1) loan origination and sale; (2) loan servicing; (3) and loan payoff, with reference to FIGS. 1-3, respectively.

Figure 1:
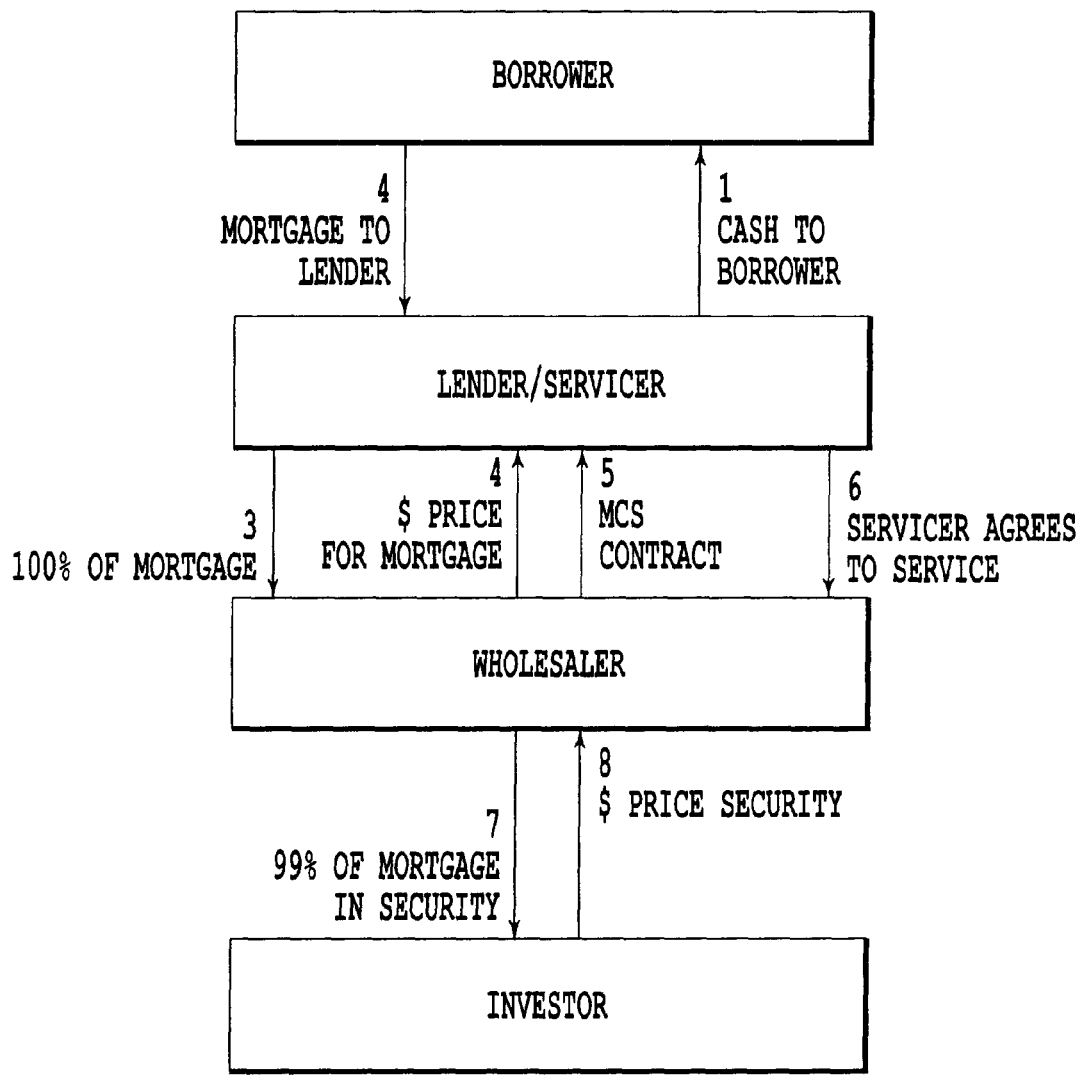
FIG. 1 is a flowchart representing the loan origination and sale operation according to an embodiment of the present invention.
Figure 2:
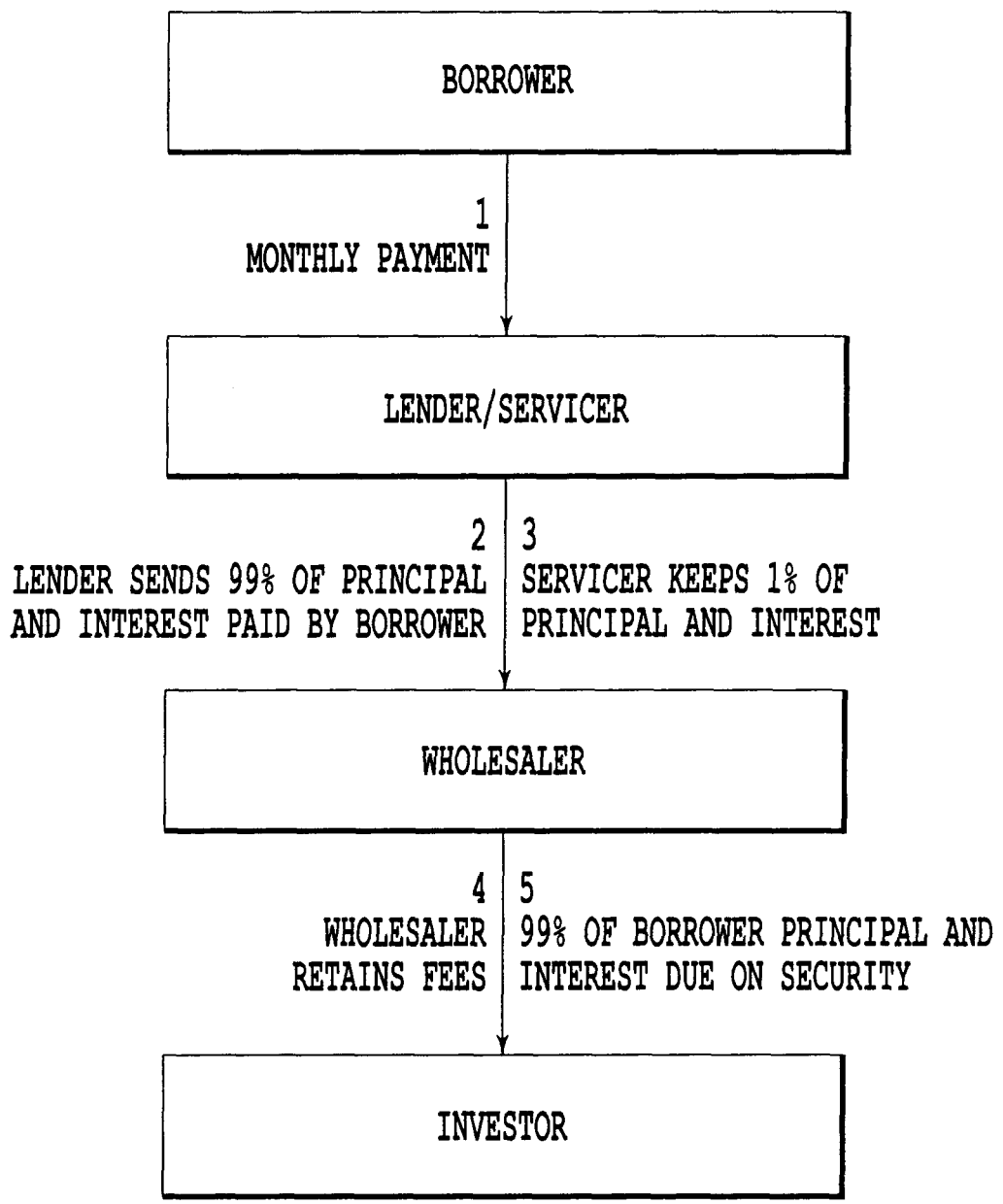
FIG. 2 is a flowchart representing the loan servicing operation according to an embodiment of the present invention.
Figure 3:
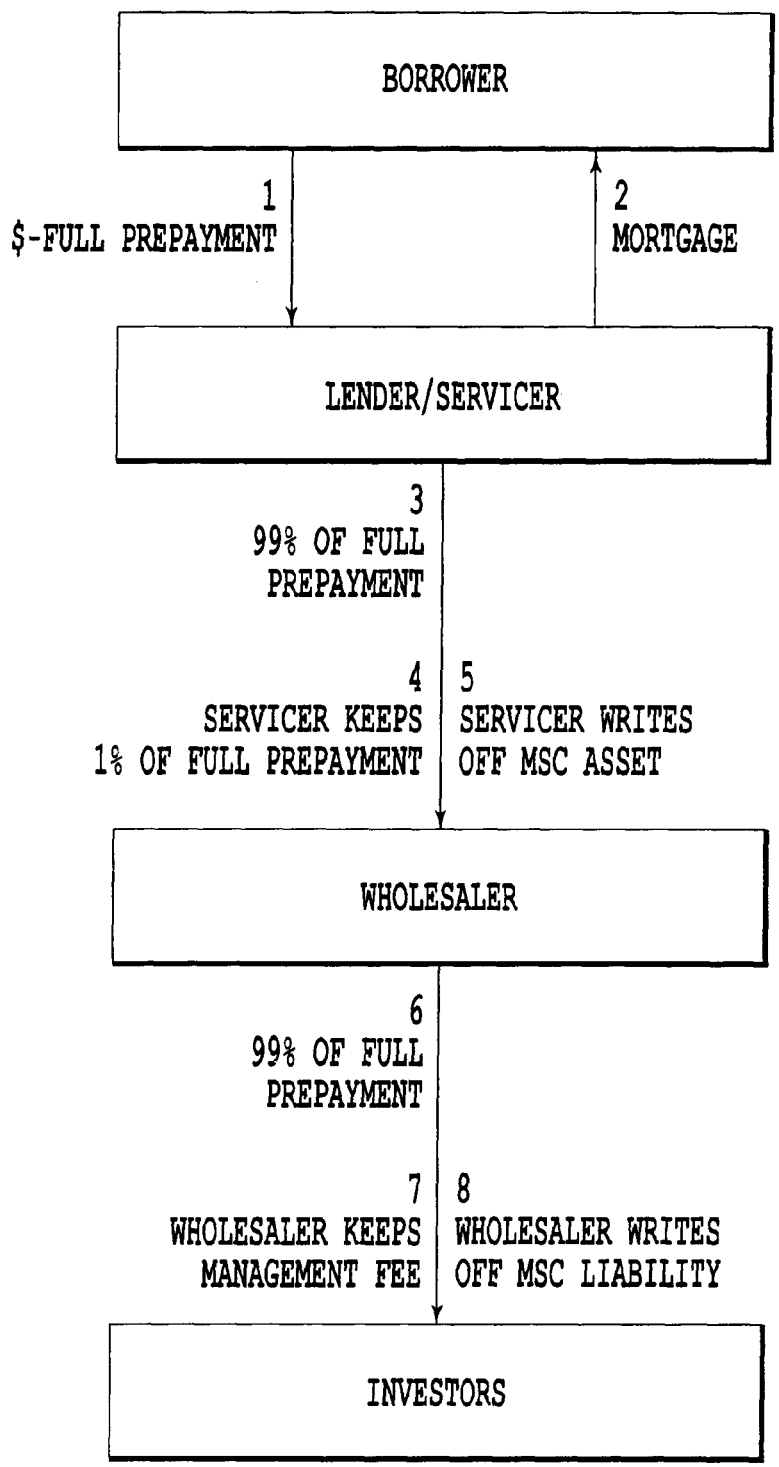
FIG. 3 is a flowchart representing the loan payoff operation according to an embodiment of the present invention.

For ease of explanation, FIGS. 1-3 show the lender as the entity that services the mortgage loan and thus the terms "lender" and "servicer" are used interchangeably herein. As will be apparent to one skilled in the relevant art(s), the lender and servicer may or may not be the same entity as explained above.

Referring to FIG. 1, a flowchart representing the loan origination and sale operation of the mortgage collateralized servicing (MCS) method, according to an embodiment of the present invention, is shown. The loan origination and sale operation of the MCS method begins in step 1 with a lender originating a mortgage loan to a consumer (i.e., borrower). For example, the lender may lend $100,000 for 30 years at an 8% interest rate. In step 2, the borrower signs the mortgage note and gives a mortgage to the lender. In step 3, the lender sells the mortgage to a wholesaler by conveying ownership of the mortgage and the mortgage note. In step 4, the wholesaler pays the purchase price to the lender for a 100% ownership of the mortgage loan.

In step 5, the wholesaler arranges for servicing of the mortgage loan. It enters into an arrangement with the servicer (who may also be the lender) to institute an MCS contract according to the present invention. The wholesaler gives the servicer the right to a percentage of the mortgage amount (e.g., 1% of the principal and interest) and other ancillary benefits. The wholesaler books the 1% interest in the mortgage as a whole loan asset and as a MCS liability. In step 6, after agreeing to service the mortgage under the MCS contract, the servicer books the value of the MCS contract as a mortgage servicing right asset in the year the right is acquired. In step 7, the wholesaler securitizes the mortgage by placing 99% of the mortgage loan (i.e., $99,000 of the original $100,000 mortgage loan) at its interest rate of 8% together with others mortgages into a mortgage pool. The wholesaler securitizes the mortgage pool and sells the security to an investor.

In step 8, the investor pays cash to the wholesaler for the security. This ends the loan origination and sale operation of the MCS method.

Referring to FIG. 2, a flowchart representing the loan servicing operation of the MCS method, according to an embodiment of the present invention, is shown. The loan servicing operation of the MCS method begins in step 1 with the borrower remitting a monthly payment to the lender. In step 2, the servicer remits 99% of the borrower's payment, according to the MCS contract, to the wholesaler. In step 3, the servicer keeps 1% of the principal and 1% of the interest paid by the borrower (as well as any ancillary income generated from the servicing relationship). In step 4, the wholesaler retains any management and guarantee fees due to it. In step 5, the wholesaler remits the remaining amount of principal and interest it received in step 2 to the investor. This ends the loan servicing operation of the MCS method as payments continue in this manner until termination of the mortgage obligation (see FIG. 3).

Referring to FIG. 3, a flowchart representing the loan payoff operation of the MCS method, according to an embodiment of the present invention, is shown. The loan payoff operation of the MCS method begins in step 1 with the borrower's paying off the outstanding balance of the mortgage loan. In step 2, the lender/servicer returns the mortgage and note to the borrower. In step 3, the servicer delivers 99% of the borrower's payoff payment, both principal and interest, according to the MCS contract, to the wholesaler. In step 4, the servicer retains, according to the MCS, 1% of the borrower's principal and interest payoff payment. For example, if the borrower prepays $50,000 in principal (together with any interest due on the principal prepayment), the servicer retains $500 in principal and 1% of any interest accompanying the prepayment. In step 5, the servicer writes off the amount of its MCS contract.

In step 6, the wholesaler remits to the investor the remaining principal due to the investor on the mortgage loan. In the above-given example, the investor would receive 99% of the $50,000 prepayment (i.e., $49,500) and any interest due to the investor. In step 7, the wholesaler retains any amount due to it for its management and guarantee fee from the remaining interest paid by the borrower. In step 8, the wholesaler writes-off both the 1% whole-loan asset and the liability represented by the MCS contract. This ends the loan payoff operation of the MCS method.

The present invention is described in terms of the above embodiment using a single mortgage loan as an example. It will be apparent to one skilled in the relevant art(s), however, that the present invention may be implemented in alternative embodiments (e.g., a percentage split different from the 99%/1% discussed herein, using a percentage split that varies over the life of a mortgage loan or a percentage allocation at a pool level rather than at the mortgage level, etc.).

III. Cash Flow Comparison

Referring to FIG. 4, a chart highlighting the advantages of the present invention's MCS contract in comparison to the current traditional MSR contract is shown. More specifically, FIG. 4 shows a cash flow table on an individual mortgage loan comparing the cash flow to a servicer from an MCS contract and a traditional MSR contract on 30-year fixed-rate mortgage of $100,000 with an interest rate of 8%. The MCS contract cash flow represents an amount equal to 1% of the principal amount of the mortgage ($1000) at 8% per annum. The traditional MSR contract cash flow represents an amount equal to 0.25% interest on the entire principal amount of the mortgage loan ($100,000).

FIG. 4 shows the total cash compensation to the servicer under each type of contract, assuming that the mortgage prepaid at the end of each year indicated. For example, the first row indicates the difference between cash flow paid under the MCS contract and under the MSR contract if the mortgage were prepaid at the end of the first year; the second row indicates the same difference as if the mortgage were prepaid at the end of the second year, and so on through the end of the ninth year. The total cash flow to the servicer under the MCS contract less the total cash flow to the servicer under the traditional MSR contract is shown in the fourth column under "Difference."

As is indicated FIG. 4, if the mortgage in the example were paid off during the first through the sixth year after origination, the servicer would receive total compensation under the MCS contract that exceeds the total compensation under the traditional MSR contract. For example, if the mortgage loan were paid off at the end of the third year, the servicer would receive a cash flow of $1236.96 under the MCS contract versus a cash flow of $740.49 under the traditional MSR contract. In this scenario the MCS contract pays a total of $496.47 more than the traditional MSR contract.

If the mortgage loan is prepaid after the sixth year in the above example, however, the servicer's total cash flow would be less under the MCS contract than under the traditional MSR contract. For example, if the mortgage loan were paid off at the end of the ninth year, the servicer under an MCS contract would receive a cash flow of $1686.83 versus a cash flow of $2146.36 under the traditional MSR contract. In this scenario, the MCS contract would pay a total of $459.52 less than the traditional MSR contract.

The difference between the cash flow on MCS and MSR contracts will also depend on the interest rate of the mortgage. The lower the interest rate, the earlier in the term of the mortgage the traditional MSR contract total cash flow will exceed the MCS cash flow.

The difference between the net cash flow on the MCS and MSR contracts (that is, the cash flow minus the costs of hedging) would depend on the servicer's costs to hedge the MSR contract. The higher the cost of hedging the traditional MSR position, the later in the term of the mortgage loan the MCS contract net cash flow will continue to exceed the traditional MSR net cash flow.

IV. Alternate MCS Embodiment

In an alternate embodiment of the method of the present invention, the wholesaler would create a self-hedging MSR "synthetically." That is, the wholesaler would include 100% of the principal amount of the mortgage loan in the mortgage pool. Thus, using the 30-year $100,000 mortgage loan principal at 8% interest rate example from Section II above, the entire $100,000 would be included in the mortgage pool. The wholesaler would then sell the mortgage pool, thus obtaining cash in exchange for the entire mortgage (less any management and guarantee fee it might retain). A portion of that cash would provide present value proceeds for the wholesaler to use to offset its liability to pay for the servicing of the mortgage. The wholesaler would then designate a portion of the proceeds for that purpose and could then chose to invest those proceeds as an asset.

To create the servicing contract, the wholesaler and the servicer agree on a formula for: (1) a monthly cash payment (the equivalent of the "interest" payment in the embodiment presented above in Section II); and (2) a final "principal" payment at the mortgage's maturity or prepayment to be paid by the wholesaler to the servicer. This agreed-upon formula would be related to the mortgage to be serviced. The terms of the formula, however, may differ from the terms of the mortgage itself (i.e., the monthly cash payment or "interest" payment may be based on an interest calculation that differs from the interest payable on the underlying mortgage loan). For example, although a mortgage bears a fixed rate of interest of 8% per annum, the wholesaler and the servicer may prefer a monthly payment based upon an adjustable rate such as the London Interbank Official Rate (LIBOR) or the like.

In another example, the wholesaler and the servicer may prefer to agree on an adjustable payment that was based on a multiple of LIBOR, or an inverse of LIBOR. More specifically, an example LIBOR "interest" formula would be a monthly payment equaling:

LIBOR—(6.5% on an agreed principal amount);
or:
LIBOR—(6.5% on the amortizing principal amount of the mortgage loan);
or they could agree to any alternative principal amount. Examples of alternative principal amounts include: (1) the original (amortized or unamortized) principal amount of the mortgage of $100,000; (2) a fixed paid-down principal amount equal to three-fourths (3⁄4) of the original mortgage amount; or (3) a sliding-scale principal amount such as $100,000 for the first 5 years, decreasing $20,000 each 5-year interval thereafter.

Using the 30-year, $100,000 mortgage loan principal at 8% interest rate example; and alternative (2) above (i.e., 3⁄4 of the original mortgage amount or $75,000), the present embodiment of the method of the present invention is now further detailed.

The wholesaler and servicer would each desire that the "principal" portion of the servicing income to be paid in the same manner as in the embodiment presented in Section II above. Thus, a payment at the end of the mortgage term (or upon prepayment) on an agreed-upon percentage (e.g., 1% as used in explaining the embodiment of Section II) on the agreed-upon principal amount (in this example $75,000), would be arranged. Then, as with the embodiment presented in Section II above, the contract for servicing between the wholesaler and the servicer would include some form of monthly cash (or "interest") payment amount based upon the agreed upon "interest" formula and a final "principal" payment amount that constitutes a "hedge" for the servicer upon prepayment of the mortgage loan.

In this embodiment, the wholesaler would also record, for accounting purposes, the liability for its servicing contract with the servicer and any designated offsetting amount (or investment of that amount) received from the proceeds of the securitized mortgage sale.

The servicer that acquires the MCS contract from the wholesaler values the MCS contract in accordance with its normal method of accounting and places it on its books as an asset. As the servicer begins to receive payments from the borrower, the servicer sends 100% of the principal and interest paid by the borrower to the wholesaler. The servicer receives monthly payments from the wholesaler under its servicing contract. Payments continue in this manner until the mortgage obligation is fully discharged.

If the borrower prepays the mortgage loan, this present embodiment would then involve the wholesaler's payment to the servicer of the "interest" formula in the month of the prepayment in the agreed-upon percentage amount (e.g., LIBOR—6.5%) of the agreed-upon principal amount ($75,000) and a percentage (e.g., 1%) of the $75,000 principal amount (e.g., $750). The wholesaler would then write down any offsetting asset and extinguish its contractual liability to the servicer to service the mortgage. The servicer would record its principal and interest on the prepayment as income and write off the value of its MCS contract.

V. Environment

Figure 5:
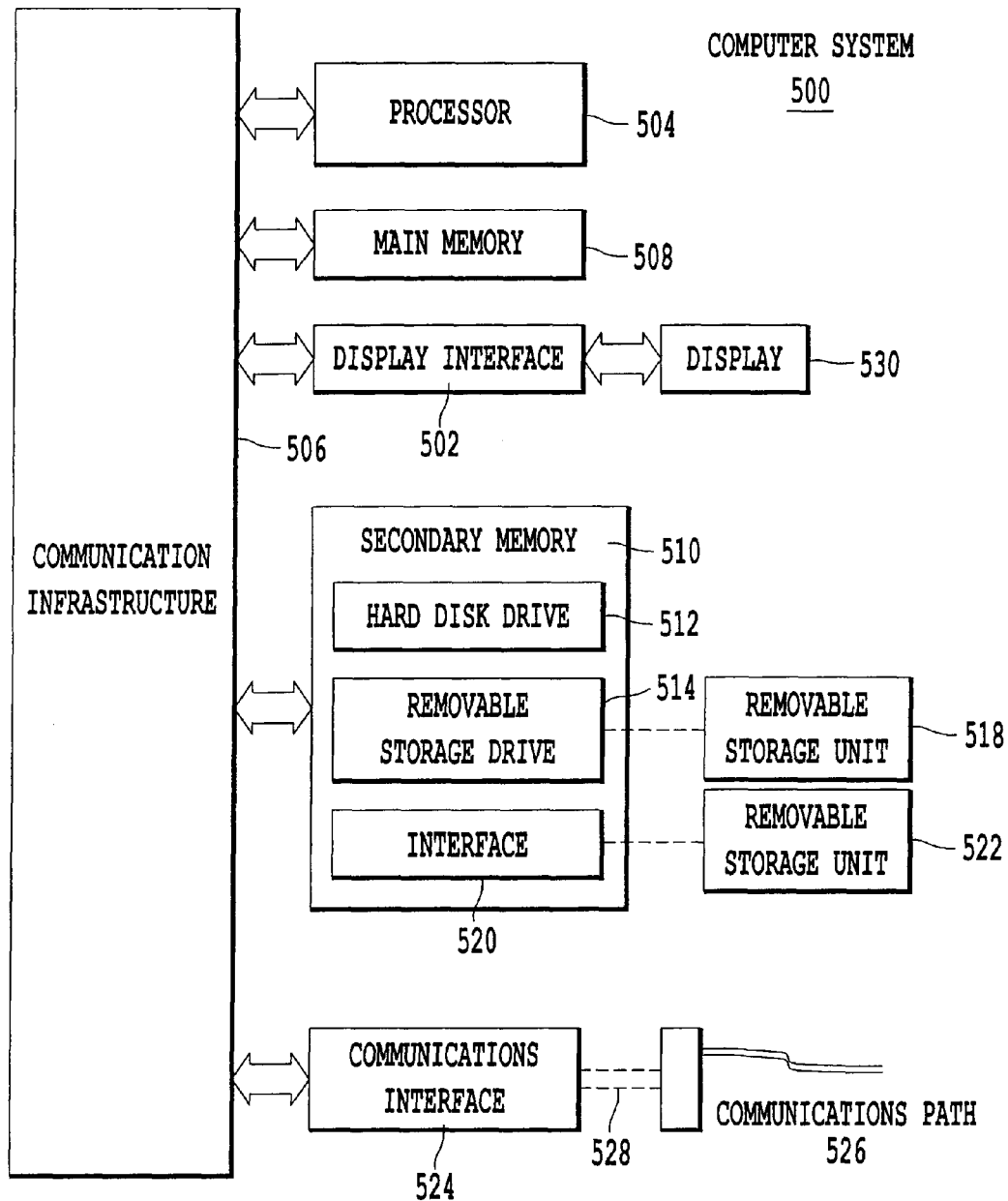
FIG. 5 is a block diagram of an exemplary computer system useful for implementing the present invention.

The present invention (i.e., the MCS method described herein or any part thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 500 is shown in FIG. 5. The computer system 500 includes one or more processors, such as processor 504. The processor 504 is connected to a communication infrastructure 506 (e.g., a communication bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, a phone line, a cellular phone link, an RF link and other communications channels.

In this document, the terms "computer program medium" and "computer usable medium" are used to generally refer to media such as removable storage drive 514, a hard disk installed in hard disk drive 512, and signals 528. These computer program products are means for providing software to computer system 500. The invention is directed to such computer program products.

Computer programs (also called computer control logic) are stored in main memory 508 and/or secondary memory 510. Computer programs may also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

The invention claimed is:

1. A method implemented by a computer system for a mortgage loan wholesaler to structure a mortgage servicing right asset to include a hedging component, comprising the steps of:
   (1) acquiring information regarding a purchased mortgage loan with a communications interface of the computer system, wherein said mortgage loan includes a principal amount and an interest rate, said mortgage loan is associated with a mortgage servicing contract with a servicer, and said acquiring includes storing the information in a storage device;
   (2) using a processor of the computer system to create a security to be sold to an investor by securitizing a first percentage of said principal amount of said mortgage loan;
   (3) storing, by the wholesaler, a record in the storage device corresponding to a retained right to a second percentage of said principal amount of said mortgage loan and to any accumulated interest therein based on said interest rate, said second percentage of said principal amount being retained by the servicer and serving to hedge a value of the mortgage services right asset against early repayment of the mortgage loan;
   (4) recording in an electronic database, for accounting purposes, a whole-loan asset equal to said second percentage and an offsetting liability represented by said mortgage servicing contract;
   (5) storing a record corresponding to payments received from the servicer equal to said first percentage of payments received by the servicer from a consumer repaying said mortgage loan;
   (6) passing information corresponding to said payments received in step (5) to said investor through the computer network; and
   (7) calculating with the processor and storing in the storage device one of a balance and an interest for of one of said wholesaler, investor and servicer.

2. The method of claim 1, wherein said first percentage is ninety-nine percent.

3. The method of claim 1, wherein said second percentage is one percent.

4. The method of claim 1, wherein said first percentage and said second percentage total one hundred percent.

5. The method of claim 1, wherein step (4) comprises the step of:
   writing off, for accounting purposes, both said whole-loan asset and said offsetting liability in said electronic database when the consumer completely pays off said principal amount.

6. The method of claim 1, wherein step (6) comprises the step of:
   subtracting a management fee from said payments received in step (5) before passing said payments to said investor.

7. A method implemented by a computer system for a mortgage loan servicer to obtain a mortgage servicing right asset that includes a hedging component, comprising the steps of:
   (1) receiving from a wholesaler a mortgage servicing right contract through a communications interface of the computer system and storing a record of said mortgage servicing right contract in a storage device, wherein said mortgage servicing right contract is associated with a mortgage loan that includes a principal amount and an interest rate to be paid by a consumer;
   (2) recording in an electronic database, for accounting purposes, said mortgage servicing right contract as an asset;
   (3) storing a record in the storage device corresponding to a received payment from said consumer, wherein said payment reflects a remuneration towards repayment of said principal amount and an accumulated interest based on said interest rate;
   (4) determining, with a processor of the computer system, a first percentage of said payment to retain and a second percentage of said payment to be forwarded to said wholesaler, said retained first percentage of said payment serving to hedge a value of the mortgage services right asset against early repayment of the mortgage loan wherein said first percentage and said second percentage are specified in said mortgage servicing right contract, wherein said retaining includes storing a record corresponding to the first percentage of said payment in the storage device;
   (5) determining, with the processor of the computer system, a value of said mortgage servicing right contract to write off, for accounting purposes, when said payment received from said consumer completely pays off said principal amount; and (6) calculating with the processor of the computer system and storing in the storage device one of a balance and an interest for one of said wholesaler and consumer.

8. The method of claim 7, wherein said first percentage is one percent.

9. The method of claim 7, wherein said second percentage is ninety-nine percent.

10. The method of claim 7, wherein said first percentage and said second percentage total one hundred percent.

11. The method of claim 7, further comprising the steps of:
(6) originating, by said mortgage loan servicer, said mortgage loan to said consumer, wherein said originating includes storing a record of the originating in the storage device; and
(7) conveying ownership rights to said mortgage loan to said wholesaler in exchange for value approximately equaling said principal amount, wherein said conveying includes creating a record of the conveyance in the storage device.

12. The method of claim 7, further comprising the steps of:
(6) storing, in the storage device, a record corresponding to a monthly cash payment received from the wholesaler; and
(7) storing, in the storage device, a record corresponding to a final principal payment at the maturity or prepayment of the mortgage loan from a wholesaler, wherein the final principal payment is based upon a formula related to the mortgage loan to be serviced.

13. The method of claim 12, wherein the final principal payment is based on a multiple of LIBOR percentage of the mortgage principal amount.

14. The method of claim 13, wherein the mortgage principal amount is a fixed paid-down principal amount equal to three-fourths of an original mortgage amount.

15. The method of claim 13, wherein the mortgage principal amount is a sliding-scale principal amount.

16. The method of claim 12, wherein said first percentage is zero percent and said second percentage is one hundred percent.

17. A computer system configured to structure a mortgage servicing right asset to include a hedging component for a mortgage loan wholesaler, comprising:
a processor;
a communications interface; and
a storage device, wherein
the processor is configured to interact with the communications interface and the storage device,
said communications interface is configured to acquire information regarding a purchased mortgage loan, wherein said mortgage loan includes a principal amount and an interest rate, said mortgage loan is associated with a mortgage servicing contract with a servicer,
said storage device is configured to store the information regarding the purchased mortgage loan,
said processor is configured to create a security to be sold to an investor by securitizing a first percentage of said principal amount of said mortgage loan,
said storage device is configured to store a record corresponding to a right to a second percentage of said principal amount of said mortgage loan and to any accumulated interest therein based on said interest rate, said second percentage of said principal amount being retained by the servicer and serving to hedge a value of the mortgage services right asset against early repayment of the mortgage loan,
an electronic database is configured to store, for accounting purposes, a whole-loan asset equal to said second percentage and an offsetting liability represented by said mortgage servicing contract,
said storage device is configured to store a record corresponding to payments received from the servicer equal to said first percentage of payments received by the servicer from the consumer repaying said mortgage loan;
said communications interface is configured to pass information corresponding to said received payment to said investor, and
the processor is configured to calculate one of a balance and an interest for of one of said wholesaler, investor and servicer.

18. A computer system to obtain a mortgage servicing right asset that includes a hedging component for a mortgage loan servicer, comprising:
a processor;
a communications interface; and
a storage device, wherein
the processor is configured to interact with the communications interface and the storage device,
said communications interface is configured to receive information corresponding to a mortgage servicing right contract,
said storage device is configured to store a record of said information corresponding to the mortgage servicing right contract, said mortgage servicing right contract is associated with a mortgage loan that includes a principal amount and an interest rate to be paid by a consumer,
an electronic database is configured to store, for accounting purposes, said mortgage servicing right contract as an asset,
said storage device is configured to store a record corresponding to a received payment from said consumer,
said payment reflects a remuneration towards repayment of said principal amount and an accumulated interest based on said interest rate,
said processor is configured to determine a first percentage of said payment to retain and to determine a second percentage of said payment to be forwarded to a wholesaler,
said first percentage of said payment serving to hedge a value of the mortgage services right asset against early repayment of the mortgage loan wherein said first percentage and said second percentage are specified in said mortgage servicing right contract,
said processor is configured to determine a value of said mortgage servicing right contract to write off, for accounting purposes, when said payment received from said consumer completely pays off said principal amount, and
said processor is configured to calculate one of a balance and an interest for one of said wholesaler and consumer, and to cause the one of the balance and interest to be stored.

19. A method implemented by a computer system for a mortgage loan wholesaler to structure a mortgage servicing right asset to included a hedging component, comprising steps of:
(1) acquiring information regarding a purchased mortgage loan with a communications interface of the computer system, wherein said mortgage loan includes a principal amount and an interest rate, said mortgage loan is associated with a mortgage servicing contract with a servicer, and said acquiring includes storing the information in a storage device;

(2) using a processor of the computer system to create a security to be sold to an investor by securitizing said principal amount of said mortgage loan;

(3) selling the security to an investor using the processor;

(4) using the processor to determine a percentage of proceeds from step (3) to provide present value proceeds for the wholesaler to use to offset its liability to pay for servicing of the mortgage loan; and (5) using the processor to determine a monthly payment to the servicer and a final payment to the servicer at a maturity or prepayment of the mortgage loan.

20. The method of claim 19, further comprising:
investing the first percentage of the proceeds as an asset through a network connected to the computer system; and
using proceeds from investing the asset to pay the servicer.

21. A computer system configured to structure a mortgage servicing right asset for a wholesaler to include a hedging component, comprising:
a processor;
a communications interface; and
a storage device, wherein
the processor is configured to interact with the communications interface and the storage device,
the communication interface is configured to acquire information regarding a purchased mortgage loan, said mortgage loan includes a principal amount and an interest rate, said mortgage loan is associated with a mortgage servicing contract with a servicer,
the storage device is configured to store a record corresponding to the information regarding a purchased mortgage loan,
the processor is configured to create a security to be sold to an investor by securitizing said principal amount of said mortgage loan and to sell the security to an investor,
the processor is configured to determine a percentage of proceeds from the sale of the security to provide present value proceeds for the wholesaler to use to offset its liability to pay for servicing of the mortgage loan, and
the processor is configured to determine a monthly payment to the servicer and a final payment to the servicer at a maturity or prepayment of the mortgage loan.

22. The computer system of claim 21, wherein
the processor is configured to invest the first percentage of the proceeds as an asset through a network connected to the computer system,
the processor is configured to determine an amount of proceeds from investing the asset to pay the servicer.

* * * * *